United States Patent
Hourne

(10) Patent No.: US 9,696,184 B2
(45) Date of Patent: Jul. 4, 2017

(54) POSITION-DETECTING UNIT HAVING REDUCED OFFSET VOLTAGE, AND METHOD USING SUCH A UNIT

(71) Applicants: CONTINENTAL AUTOMOTIVE FRANCE, Toulouse (FR); CONTINENTAL AUTOMOTIVE GMBH, Hannover (DE)

(72) Inventor: Xavier Hourne, Cugnaux (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/650,611

(22) PCT Filed: Dec. 10, 2013

(86) PCT No.: PCT/EP2013/003729
§ 371 (c)(1),
(2) Date: Jun. 9, 2015

(87) PCT Pub. No.: WO2014/090395
PCT Pub. Date: Jun. 19, 2014

(65) Prior Publication Data
US 2015/0330812 A1  Nov. 19, 2015

(30) Foreign Application Priority Data
Dec. 10, 2012 (FR) ...................... 12 61818

(51) Int. Cl.
*G01D 5/20* (2006.01)
(52) U.S. Cl.
CPC .................. *G01D 5/204* (2013.01)
(58) Field of Classification Search
CPC . G01D 5/2266; G01D 5/2291; G01D 5/24476
See application file for complete search history.

(56) References Cited

U.S. PATENT DOCUMENTS 5,180,979 A  1/1993 Frazzini et al.
5,801,645 A  9/1998 Erickson et al.
(Continued)

FOREIGN PATENT DOCUMENTS

CN  1582385  2/2005
CN  201051134  4/2008
(Continued)

OTHER PUBLICATIONS

International Search Report, dated Jun. 12, 2014, from corresponding PCT application.

*Primary Examiner* — Clayton E Laballe
*Assistant Examiner* — Noam Reisner
(74) *Attorney, Agent, or Firm* — Young & Thompson

(57) ABSTRACT

To eliminate measurement errors, such as "offset voltages" in sensors of the inductive type by modifying the architecture of the assembly of elements used for signal processing, the architecture of the apparatuses processing the signal from the secondary windings is modified as follows:
  the amplifiers of this sensor are placed between the low-pass filters and the output terminals of the sensor,
  the voltages from the two secondary windings pass into an RC filter including a resistor and a capacitor,
  the voltage from each of the secondary windings passes into two multiplexers, one of which allows only the positive half-cycle to pass through, the other being wired so as to allow only the negative half-cycle to pass through, and the unused outputs of these multiplexers are connected to the common point between the secondary windings,
  low-pass filters are placed between each of the multiplexers and the amplifiers.

4 Claims, 2 Drawing Sheets

(56) References Cited

U.S. PATENT DOCUMENTS

| | | | |
|---|---|---|---|
| 8,258,784 B2* | 9/2012 | Pearce | G01R 33/12 |
| | | | 324/207.15 |
| 2005/0030010 A1 | 2/2005 | Jones et al. | |
| 2005/0270211 A1 | 12/2005 | Barcelona | |
| 2007/0139040 A1 | 6/2007 | Jones et al. | |
| 2012/0041695 A1 | 2/2012 | Baldwin | |
| 2013/0082682 A1* | 4/2013 | Horvath | G01R 19/16528 |
| | | | 324/103 R |
| 2014/0067289 A1 | 3/2014 | Baldwin | |
| 2015/0142353 A1* | 5/2015 | Cabret | G01D 5/2291 |
| | | | 702/64 |

FOREIGN PATENT DOCUMENTS

| | | |
|---|---|---|
| CN | 102374876 | 3/2012 |
| EP | 0182085 A2 | 5/1986 |
| EP | 0468642 A2 | 1/1992 |
| EP | 0768515 A1 | 4/1997 |
| FR | 2542468 A1 | 9/1984 |

* cited by examiner

POSITION-DETECTING UNIT HAVING REDUCED OFFSET VOLTAGE, AND METHOD USING SUCH A UNIT

BACKGROUND OF THE INVENTION

Field of the Invention

The invention relates to a unit for detecting the position of a moving part, said unit having reduced offset voltage and comprising a position sensor of the inductive type and apparatuses for processing the signal of this sensor. The voltage measurement error of a sensor, referred to as the offset voltage, corresponds to the difference between the measured value of the position of the moving part and the actual position of this part.

Thus, in the primary application, but not exclusively, the invention relates to the improvement of the position measurement given by rotary sensors. These rotary sensors have numerous applications in the field of industrial automation, in particular each time it is necessary to monitor, with sufficient accuracy, the position of a moving mechanical element. For example, the monitoring of the angular position of a motor turning at up to 15000 revolutions per minute is systematic.

Description of the Related Art

Position sensors of the inductive type give the position of mechanical parts thanks to the analysis of electrical currents or voltages that vary depending on the displacement of a moving part element. This moving element may be either the part itself or a moving element referred to as a target, which is fixed on the part, wherein it is sought to know the position of said moving element. The electrical voltages to be analyzed are induced, in the case of induction flat panel detectors, by a high-frequency alternating current passing through a fixed circuit, referred to as a primary circuit, generally provided in loop form on a flat surface. This high-frequency alternating current induces a magnetic field at the same frequency as the current passing through it, in at least one secondary circuit.

The secondary circuits are also fixed. Each secondary circuit is placed on a flat surface close to that of the primary circuit, thus forming at least two loops for which the couplings between the primary circuit and the loops of the secondary circuits create a magnetic flux in each of the loops of the secondary circuits. The moving target cuts the passage of the magnetic flux, and therefore the voltage induced by the magnetic field in the loops varies depending on the position of the target in front of these loops.

The induction sensor may have a planar construction, but also an axial construction, with the primary circuit and the secondary circuits in the form of solenoids, and the target, which is cylindrical, which moves back and forth between the solenoid of the primary circuit and the solenoids of the secondary circuits. The result in terms of analysis of the voltages at the terminals of the secondary circuits is the same.

Voltage measurements are taken at the terminals of the secondary windings, and the measured voltages describe curves similar to sine curves, between a negative minimum value and a positive maximum value. In the conventional case, in which two secondary circuits are positioned, the curve of one secondary winding is that of a sine, and that of the other secondary winding is that of a cosine.

The result of the voltages received at the terminals of the secondary circuits is first processed so as to be shaped: firstly, a demodulation removes the high-frequency component caused by the current of the primary circuit, then a calculation on the basis of the signals referred to as sine and cosine signals, from the secondary circuits, provides the angular position of the target with the aid of an arctangent function.

The processing of these signals is described for example in patent documents FR 2 542 468, EP 0 182 085 or EP 0 468 642. It utilizes primarily the following apparatuses between the output terminals of the secondary windings and the output terminals of the sensor:

an amplifier placed at the terminals of each secondary circuit, intended to amplify the signal received from one or the other secondary circuit; preferably one amplifier per secondary circuit processes the two circuits simultaneously, which makes it possible to avoid any delay of the processing of the signals;

a signal shaping circuit with demodulation and low-pass filter; the demodulation is carried out by multiplexers connected via interrupters (also referred to as switches). At the output of this shaping circuit, a signal in sine form is thus obtained corresponding to one secondary circuit, and a signal in cosine form is thus obtained for the other secondary circuit.

These sinusoidal signals, which represent the displacement of the target, are deformed by parasitic pulses (see references 10, 11 and 13 in FIG. 2). These deformations manifest themselves by parasitic signals in the sinusoidal curves as illustrated by FIGS. 1 and 2 hereinafter, which leads to errors in the calculation of the angular position of the target. These parasitic signals 10, 11 and 13 are inherent to the design of the sensors according to the prior art, and are caused primarily by the two following apparatuses: the amplifier, which amplifies both the measured value and the errors, and the switches serving as demodulator. In fact, one of the outputs of these switches is not connected to any element, which injects parasitic pulses into the servo loop of the amplifier when the multiplexer is connected in this loop. These parasitic signals create measurement errors.

SUMMARY OF THE INVENTION

The invention aims to do away with these measurement errors, referred to as offset voltages, by optimizing the architecture of the assembly of the elements used to process and to analyze signals so as to minimize the effect of these offset voltages.

More specifically, the invention relates to a detecting unit intended to measure the position of a moving element with a reduced offset voltage. This unit comprises a sensor of the inductive type, provided with a fixed primary winding, with one or more fixed secondary windings, and a moving element able to modify the magnetic field created in the secondary windings so as to induce a signal indicating the position of this moving element. This unit also comprises, in conjunction with the output of the secondary windings of the sensor, apparatuses for processing the signal of this sensor, comprising in particular signal amplifiers, and multiplexers connected to the output terminals via low-pass filters. In this unit, the amplifiers are connected on one side to the low-pass filters and on the other side to the output terminals of the sensor.

Inserting the amplifiers after the processing of the single on the side of the output terminals of the sensor rather than on the side of the output terminals of the secondary windings presents the advantage of amplifying signals that have already been cleaned of their parasitic pulses.

In accordance with advantageous features, the detection unit according to the invention comprises:

at least one RC filter (i.e. a filter comprising a resistor R and a capacitor C), through which the voltage from each secondary winding passes, which eliminates an undesirable injection of electrical charge into the measurement circuit;

two multiplexers connected in parallel, through each of which the voltage from each of the RC filters passes, and each able to switch between the low-pass filter and a common point situated between the secondary windings in order to eliminate the high-frequency component of these voltages.

Advantageously, with the wiring of the output of the multiplexers connected to the common point between the fixed secondary windings, the effect of the electrical pulse caused by the switching of the multiplexers on the result of the measurement is reduced. In addition, with the RC filters inserted between the output terminals of the secondary windings and the multiplexers, the parasitic pulses created by the operation of the multiplexers are significantly shortened.

The invention also relates to a method for reducing the offset voltage of the signal from a position sensor of the inductive type, in which the above detection unit is used. This method consists of processing successively and in this order the signal from a secondary winding of the detection unit:

by RC filtering,
by multiplexing used to demodulate the signal,
by low-pass filtering so as to remove the high-frequency components of this signal, and
by amplification prior to passing through the output terminals of said sensor.

BRIEF DESCRIPTION OF THE DRAWING FIGURES

Further information, features and advantages of the present invention in relation to the prior art will become clear upon reading the following non-limited description, provided with reference to the accompanying figures, in which, respectively:

DETAILED DESCRIPTION OF THE INVENTION

Figure 1:
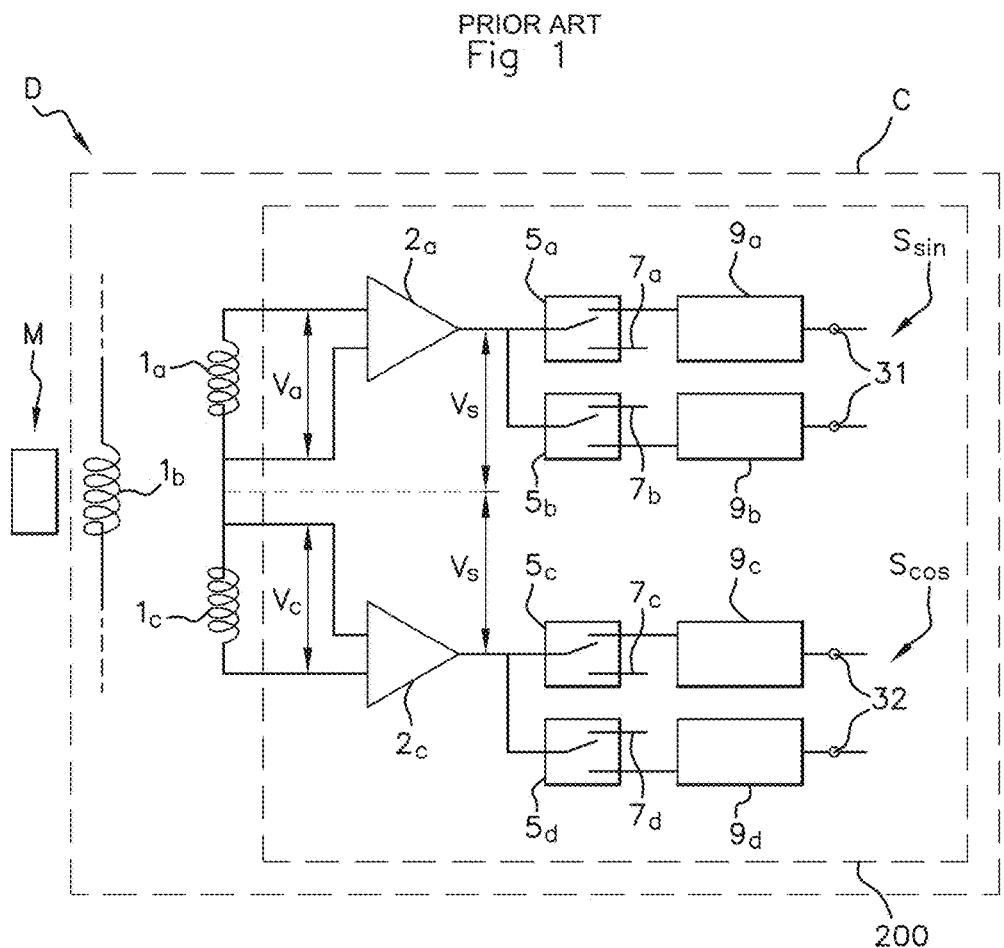
FIG. 1 shows the circuit diagram of the part of a sensor used to process received signals, in accordance with the prior art.

FIG. 1 illustrates a detection unit D of the prior art intended for measuring the position of a moving element or target M comprising a sensor C of the inductive type provided with a primary winding 1b, two secondary windings 1a and 1c, and a target M able to modify the magnetic field created in the secondary windings 1a, 1c in order to induce a signal indicating the position of the target M in relation to the sensor C. FIG. 1 also illustrates, in accordance with the prior art, the part 200 of the sensor C devoted to the processing of the position signal. This architecture is detailed between the two secondary windings 1a and 1c of said sensor C and the two output terminals 31 and 32 of the processing part 200 of this sensor C.

The voltages Va and Vc at the terminals of the secondary windings 1a and 1c are a modulation of two sinusoidal voltages: a voltage coming from the measurement of the position of the target M by the sensor C, and a high-frequency voltage induced by the high-frequency current circulating in the primary winding 1b. The architecture between the secondary windings 1a and 1c and the output terminals 31 and 32 makes it possible to demodulate the two voltages Va and Vc by eliminating the high-frequency voltage and by retaining only the voltage coming from the measurement of the position of the target M. This architecture makes it possible to eliminate the parasitic pulses to the best possible extent.

In order to carry out these operations of demodulation and filtering, the architecture according to the prior art comprises amplifiers 2a, 2c, multiplexers 5a to 5d, and low-pass filters 9a to 9d.

Placed at the terminals of each secondary winding 1a and 1c, an amplifier 2a or 2c amplifies the received signal by a factor of approximately 20 to 50.

The signal amplified by the amplifier 2a, 2b and delivered from the secondary winding 1a (respectively 1c) undergoes a demodulation synchronous with the frequency of the voltage Va (Vc). It is then divided across two circuits: the positive half-cycles pass through the multiplexer connected via the switch 5a (5c) and the low-pass filter 9a (9c), and the negative half-cycles pass through the multiplexer connected via the switch 5b (5d) and the low-pass filter 9b (9d).

The multiplexers 5a, 5b (5c, 5d) inject parasitic pulses as charges are sent in the signal-processing circuit. In addition, the outputs 7a to 7d of the multiplexers 5a to 5d are not connected, and, with each change of state thereof, parasitic pulses are transmitted in the processing circuit.

The output signal Ssin at the terminals 31 is sinusoidal, and the output signal Scos at the terminals 32 is also sinusoidal and offset by 90° from the signal Ssin due to the electrical wiring at 90° of the two secondary windings 1a and 1c.

Figure 2:
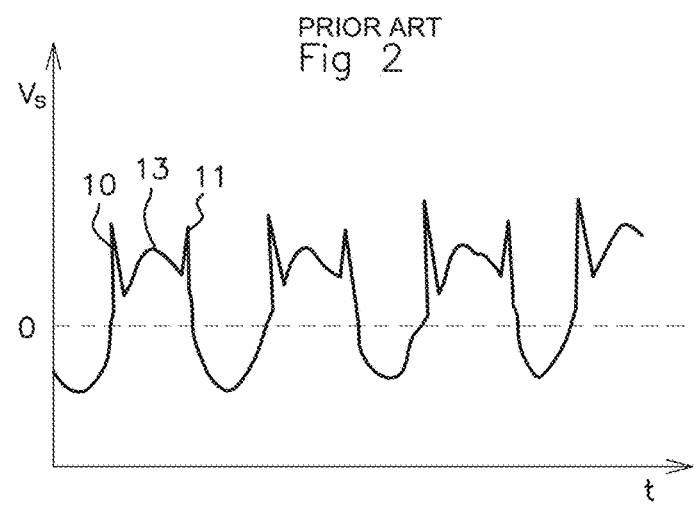
FIG. 2 shows a graph illustrating the voltage curve at the output of the amplifiers of the sensor in accordance with the prior art.

As illustrated by the graph of FIG. 2, each voltage Vs measured at the output of the amplifiers 2a or 2c is of high-frequency sinusoidal form. The amplitude of this sine curve varies depending on the angular position θ of the target.

The sine curve has a number of irregularities per cycle: here, two parasitic pulses 10 and 11, and a deformation 13 forming a shoulder. These voltage irregularities are caused primarily by the operation of the multiplexers 5a to 5d. After the step of demodulation, these irregularities constitute the "offset voltage" and falsify the restored information concerning the position of the target M that the sensor C must monitor.

Figure 3:
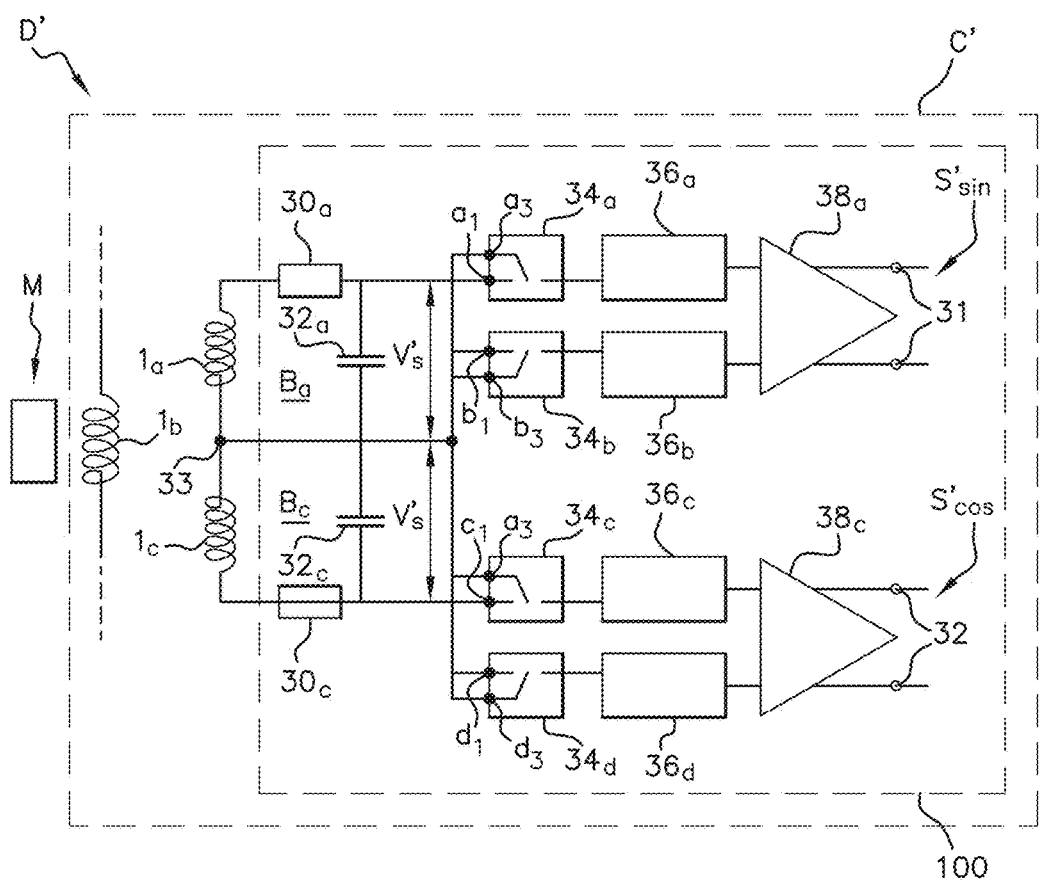
FIG. 3 shows an exemplary circuit diagram of the signal-processing apparatuses of a detection unit according to the invention.

FIG. 3 shows an exemplary embodiment of the signal-processing apparatuses 100 of a detection unit D' according to the invention able to significantly reduce the discovered voltage irregularities. This architecture is detailed in FIG. 3 between the two secondary windings 1a and 1c of the sensor C' and the two output terminals 31 and 32 of this sensor C'.

An RC filter, i.e. a filter comprising a resistor 30a (30c) and a capacitor 32a (32c), is connected to the terminals of the secondary winding 1a (respectively 1c). This filter forms an RLC circuit in a loop Ba (Bc) with the secondary winding 1a (1c) of inductance L. This RLC filter is intended to eliminate the parasitic pulses created by the multiplexers 34a, 34b (34c, 34d) as charges are sent in the signal-processing apparatuses 100.

The components of this RLC circuit are selected so as to minimize the effect of these loads—an elevated capacitance value is thus sought—whilst avoiding transforming the loop Ba (Bc) into a resonant circuit thanks to the use of a low R×C value. To this end, a compromise is thus sought. In the illustrated example the resistor R is selected so that:

$$R > 2*\sqrt{L/C}$$

with L: value of the inductance of the secondary winding 1a (1c),
C: value of the capacitance of the capacitor 32a (32c), and
R: value of the resistor 30a (30c).

The signal from the secondary winding 1a (1c) and filtered by the RC filter then passes through two multiplexers 34a, 34b (34c, 34d) installed in parallel by switching between a low-pass filter 36a, 36b (36c, 36d) and a common point 33, located between the two secondary windings 1a and 1c. In this example the multiplexer 34a only allows the positive half-cycles of the signal to pass through, the negative half-cycles being guided to the common point 33. Similarly, the multiplexer 34b allows only the negative half-cycles to pass through, thanks to a reverse installation compared with the previous installation, the positive half-cycles being guided to the common point 33.

The signal half-cycles filtered by the low-pass filters 36a, 36b (36c, 36d) then pass through an amplifier 38a (38c), which amplifies the signal by a factor of approximately several tens. The amplification at the end of the processing makes it possible to provide a sinusoidal output signal S'sin (S'cos) devoid of irregularities without introducing new irregularities, and the output signal has a sinusoidal form depending on the displacement of the target M.

Since the secondary windings 1a (1b) are installed so as to provide sinusoidal currents offset by 90° with respect to one another, the two output signals S'sin and S'cos are also offset by 90°.

Figure 4:
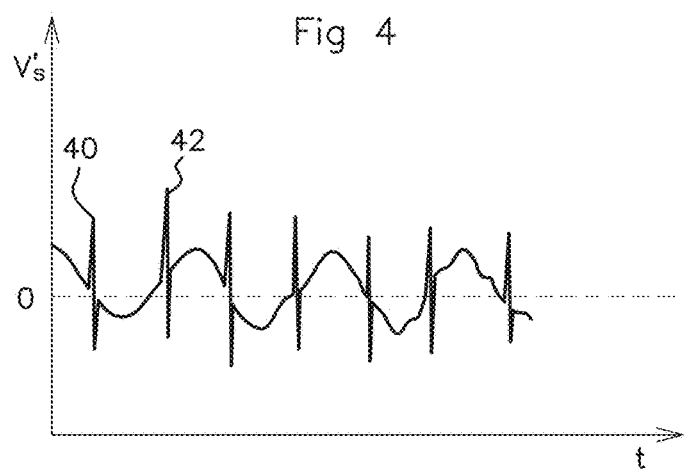
FIG. 4 shows a graph illustrating the voltage curve at the input of the multiplexers of the detection unit according to the invention.

With reference to the graph of FIG. 4, which corresponds to that of FIG. 2 for a position-detecting unit D' according to the invention, the voltage at the input of the multiplexers Vs' is illustrated over time. This voltage Vs' is measured between the terminals a1/b3 and the ground for the multiplexers 34a and 34b or between the terminals c1/d3 and the ground for the multiplexers 34c and 34d. It is of quasi-sinusoidal form. This sine curve only has, per period, two fine parasitic pulses 40 and 42, and does not present any deformation (such as the shoulder-like deformation 13 visible in FIG. 2).

The invention is not limited to the exemplary embodiments described and shown. The invention may thus also be adapted to different forms of inductive sensors or "resolvers": flat design with primary and secondary windings formed on a flat surface, or of helical or solenoid design.

In addition, the improvement of the signal obtained at the output of the secondary windings can be adapted to different types of sensors or resolvers without departing from the scope of the invention, for example: electromagnetic, inductive, or capacitive sensors or resolvers.

In addition, the invention can be applied for sensors comprising one or more than two secondary windings. In fact, the single sensors having a single secondary winding provide a single sinusoidal signal of the S'sin or S'cos type, which is processed by the apparatuses according to the invention. When the sensors have more than two secondary windings, further signals of the S'sin and S'cos type are obtained and are also processed by the apparatuses according to the invention.

The invention claimed is:
1. A detection unit, comprising:
   an inductive sensor provided:
      with a fixed primary winding,
      with one or more fixed secondary windings,
   a moving element adapted to modify a magnetic field created in the secondary windings so as to induce a signal indicating a position of the moving element, and,
   apparatuses for processing the signal of the sensor, the apparatuses being connected to an output of the secondary windings, the apparatuses comprising:
      at least one RC filter, comprising a resistor and a capacitor, through which the voltage from the secondary winding passes,
      at least two demultiplexers connected to the output terminals of the sensor via low-pass filters and connected in parallel, through each of which the voltage from each of the RC filters passes, and
      signal amplifiers, connected on one side to the low-pass filters and on the other side to the output terminals of the sensor,
   wherein the at least two demultiplexers switch between the low-pass filter and a common point located between the secondary windings.

2. A method for reducing the offset voltage of a signal from the position sensor as claimed in claim 1, comprising the processing successively and in this order the signal from the secondary winding of the detection unit:
   RC filtering, with a filter comprising a resistor and a capacitor,
   demultiplexing used to demodulate the signal,
   low-pass filtering so as to remove the high-frequency components of this signal, and
   amplification prior to passing through the output terminals of the sensor.

3. The detection unit according to claim 1, wherein the primary winding is configured to circulate high frequency current.

4. The detection unit according to claim 1, wherein there are two of the secondary windings installed so as to provide sinusoidal currents offset by 90° with respect to one another.

* * * * *